Aug. 11, 1964   W. B. MINTON   3,144,557
INTEGRATED RADIATION DOSIMETER AND CHARGER
Filed April 17, 1962   2 Sheets-Sheet 1
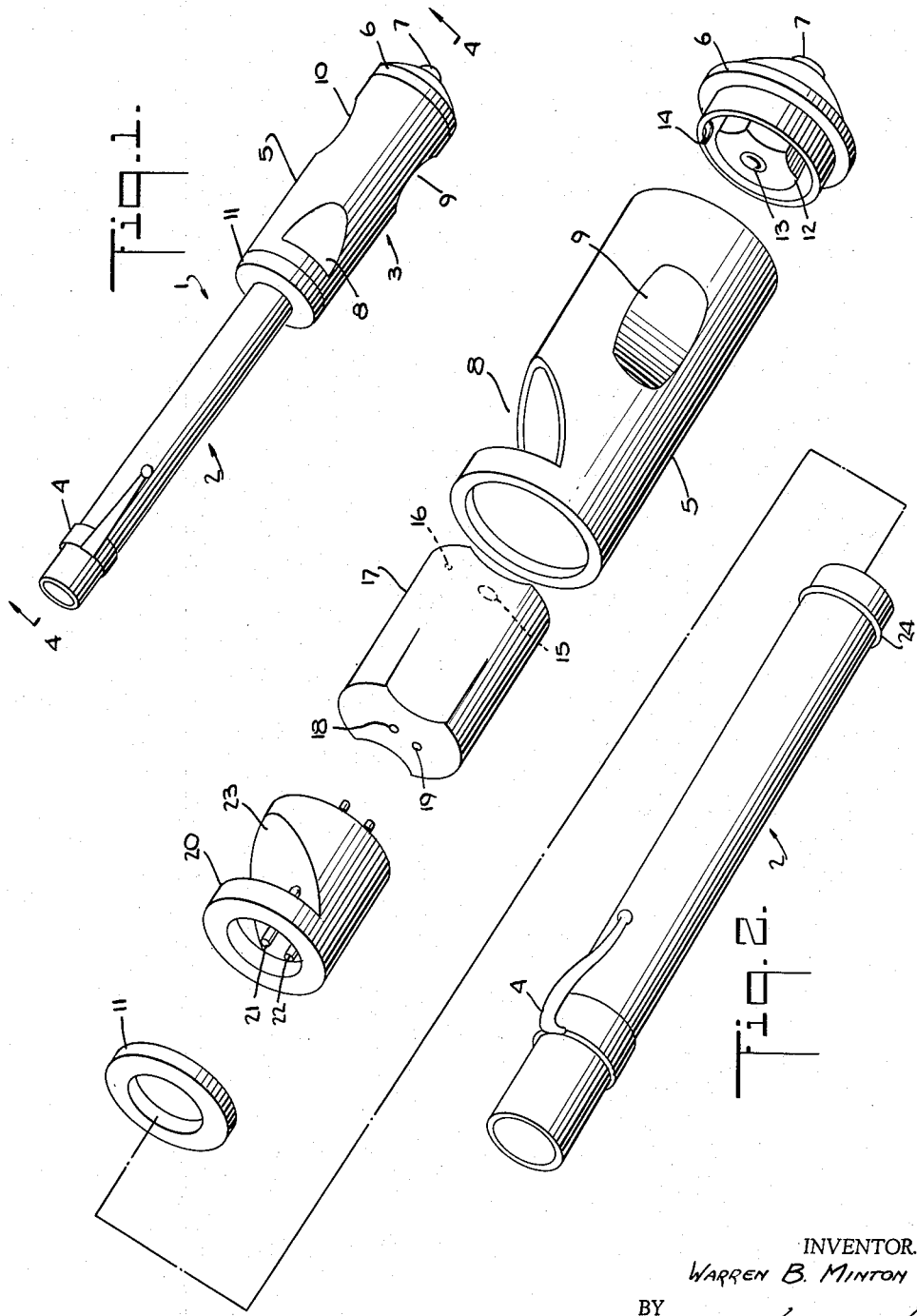
INVENTOR.
WARREN B. MINTON
BY
ATTORNEYS Aug. 11, 1964                W. B. MINTON                3,144,557
           INTEGRATED RADIATION DOSIMETER AND CHARGER
Filed April 17, 1962                          2 Sheets-Sheet 2
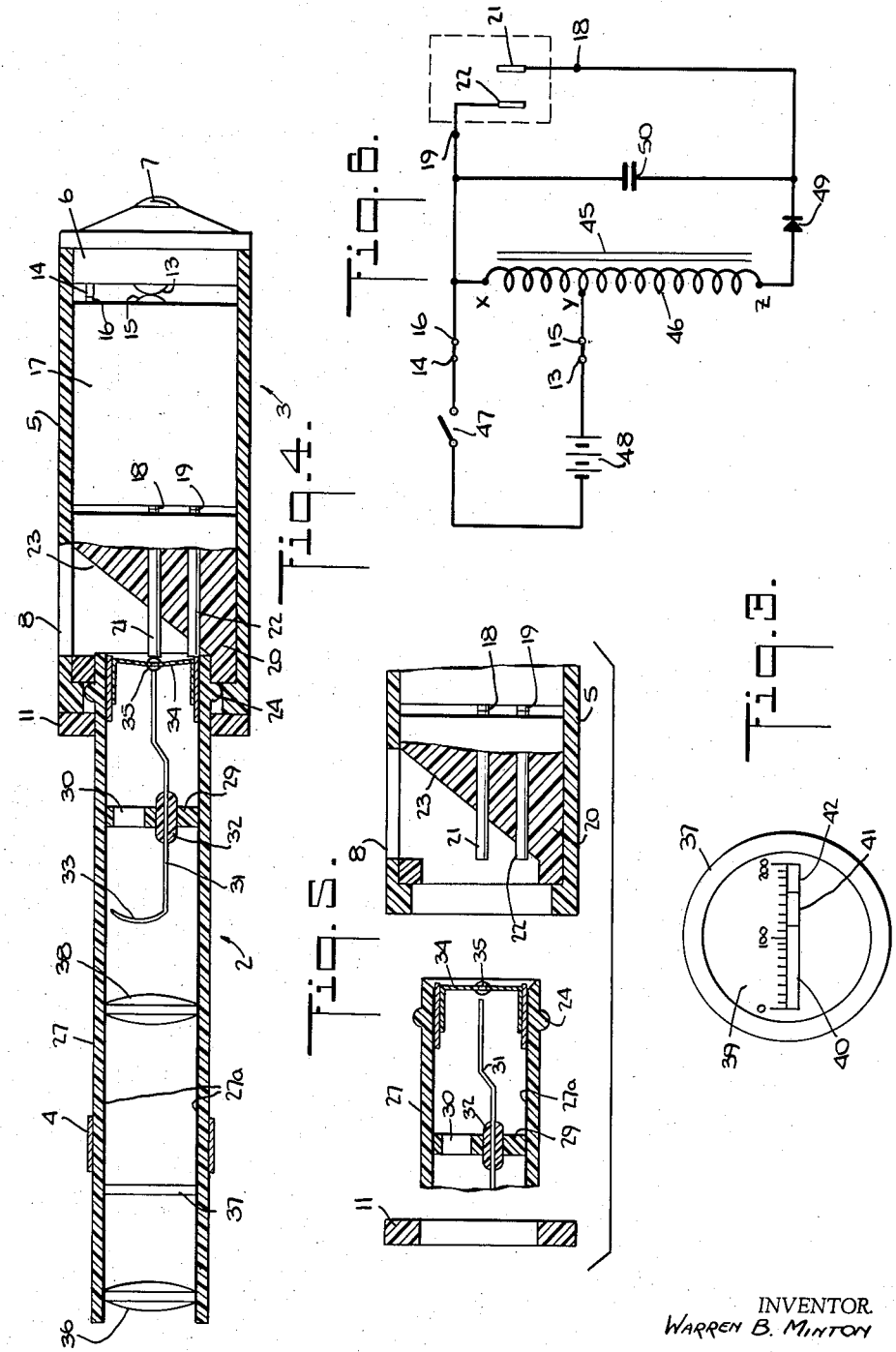
INVENTOR.
WARREN B. MINTON
BY
ATTORNEYS United States Patent Office 3,144,557
Patented Aug. 11, 1964

3,144,557
INTEGRATED RADIATION DOSIMETER AND CHARGER
Warren B. Minton, Beechwood Drive, Shrewsbury, N.J.
Filed Apr. 17, 1962, Ser. No. 188,163
1 Claim. (Cl. 250—83.3)

This invention relates to radiation detection devices and more particularly to a radiation detection device that is small and compact and that does not depend for its use on an external charging unit.

Radiation detection devices are well known in the art; the particular detector preferred to be used in this invention is a standard quartz fibre electrostatic charge pencil-type dosimeter. This type of dosimeter consists of a cylindrical case the size of a fountain pen. The inner chamber of the case acts as an ion chamber and contains two separate electrodes, one cylindrical in shape and located on the inner chamber wall, the other a short wire to which is affixed a metal coated quartz fibre insulated from the outer cylinder by a suitable plug. When a charge is applied to the two electrodes, the quartz fibre will be deflected away from its central position. When radiation bombards the chamber, ionization occurs and part of the charge leaks off, causing the fibre to deflect toward its normally central position. This deflection is a function of the amount of ionizing radiation, the position of the fibre electrode indicating on a suitable scale the cumulative amount of radiation that has occurred since the last charging. Light entering from one end of the dosimeter causes the shadow of the fibre to be cast on an enclosed opaque scale and the position of the shadow on the scale may be seen by looking into the other end of the dosimeter.

In order that the advantages of such dosimeters may be fully utilized, for example, by one in constant contact with radiation, it is highly advisable that they may be charged quickly, simply and whenever necessary. This, of course, requires ready access to charging equipment as and when necessary.

Present chargers for resetting the scale on this type of dosimeter are large and bulky, expensive and generally incapable of being conveniently carried upon one's person. These chargers require at the minimum internal light sources powered by batteries with sufficient current capacity to illuminate the light e.g. the standard "D" size alkaline flashlight battery. Use of these batteries is disadvantageous since they have a short shelf life. Where direct line current is used, the necessary light is dependent upon the continued supply of such current.

The charger contemplated by this invention is small and light, of low cost, so constructed that it may be permanently mated with the dosimeter and utilizes a unique light-gathering surface that obviates the necessity for an internal light source. The power source for this charger is small, with long shelf life e.g. a mercury button-cell type battery. Since no internal light source is used, there is little or no power drain on the battery. Also, a charging circuit is used which requires a low current drain.

The integrated dosimeter-charger is sufficiently compact to be hand-held during charging. The size and weight of the integrated unit allows it to be conveniently carried on one's person, thus making it a convenient radiation detection device for anyone who is in more or less constant contact with a source of radiation such as nuclear reactors or X-ray machines. The integrated unit is also eminently suited for storage in radiation protective shelters where storage space is minimal and simple operation and instant availability a necessity.

One object of this invention is to integrate a radiation detector and charging unit into small and compact form.

Another object of this invention is to provide an integral radiation detector and charging unit that may be easily handheld while charging and conveniently carried on one's person.

Other objects of this invention will appear from the following descriptions.

In the drawings, where like numerals refer to like elements of this invention:

FIGURE 1 is a perspective view of the integrated dosimeter-charger of this invention.

FIGURE 2 is an exploded perspective view of the dosimeter-charger of this invention.

FIGURE 3 is a view of the scale of the reticle of the dosimeter of this invention.

FIGURE 4 is a side sectional view of the dosimeter-charger of FIGURE 2 in its engaged position.

FIGURE 5 is a partial side section view of the dosimeter-charger in its disengaged position.

FIGURE 6 is a schematic diagram of a charging circuit that may be used in this invention.

In general, this invention consists of a pencil-type dosimeter and charger integral therewith. The dosimeter used in this invention is the standard quartz fiber type described above.

The charger of this invention utilizes a light gathering surface to illuminate the scale of the dosimeter. The charging circuit is comprised of a step-up auto transformer, the primary circuit of which consists of a battery, a switch and the primary windings of the transformer, and the secondary circuit of which consists of a diode connected to one side of the transformer secondary winding, a capacitance connected between the other side of the secondary and the diode, and a pair of output electrodes.

Now referring more particularly to the drawings, integrated dosimeter-charger 1 comprises a dosimeter 2 and charger 3. Dosimeter 2 may be provided with an external clip 4 for clipping the integrated unit 1 to one's clothing. Charger 3 has a case 5 with a removable battery holder 6 at one of its ends. Holder 6 has a spring switch (not shown) with button 7 mounted thereon. Part 8 is provided in the side of case 5 in order to allow entry of light from an external source. Case 5 also has arcuate shaped finger tip grips 9 and 10 molded on its outer surface. A locking cap 11 moulded into the shape of a flanged washer is provided to come into contact with ring 24 mounted on dosimeter 2.

Charger 3 consists of case 5, arcuate grip 9 (grip 10 not shown), and part 8 being formed in case 5. Battery holder 6 has a spring switch button 7 of spring switch 47 (see FIG. 6) and battery 12 mounted thereon. Contacts 13 and 14 are also mounted on holder 6, the spring switch 47 and battery 12 being connected in series and contacts 13 and 14 are the output contacts of this series connection. Contacts 15 and 16 are mounted on electronic module 17.

Module 17 contains the electronic charging circuit used in this invention and occupies the area remaining between battery holder 6 and surface 23. Module 17 also has contacts 18 and 19 mounted thereon. Module 17 is shaped so that it coincides with the depressions in case 5 made by grips 9 and 10. This allows keying for assembly for proper orientation of the contacts for connection to the battery and charging socket as hereinafter described. Charging socket 20 supports electrodes 21 and 22 and a light gathering and reflecting surface 23 which is truncated at a 45° angle and which uses a cross section parabolic in nature. Use of the 45° angle with parabolic cross section allows transmission of a center focused concentration of light up to the face of the charging contact for illumination of the dosimeter scale. Placement of this component so that it appears on the side of the charging unit allows illumination of the reticle scale of the dosimeter when held in an upright position (the proper position for accurate charging of the dosimeter).

When battery holder 6, electronic module 17 and charging socket 20 are properly positioned in case 5, contacts 13 and 14 of battery 12 engage contacts 15 and 16 of module 17 and output contacts 18 and 19 of module 17 engage charging electrodes 21 and 22 of charging socket 20. Thus the necessary connections between the components of the charging circuit and the output electrodes of the charger are made. Upon assembly the component module is placed in the tubular body, the charging socket introduced and sealed.

Washer shaped ring 24 is affixed to dosimeter 2 at its charging contact end. The inside diameter of cap 11 is large enough to slide over the band of the dosimeter but smaller than that of ring 24. Cap 11 is placed on the barrel of dosimeter 2 before securing ring 24. After assembly of charger 3, dosimeter 2 is placed in charging socket 20 and cap 11 is slid down over the charging end of the charger. Provision is made for clearance between cap 11 and the face of socket 20 so that dosimeter 2 may be moved in and out approximately 1/16" to allow charging contact to be made in dosimeter 2. At the same time dosimeter 2 is allowed to rotate freely with respect to charger 3.

Dosimeter 2 consists of an outer casing 27 and an inner chamber 28. The inner surface of casing 27 is coated with an electrically conductive material 27a such as graphite and serves as a cylindrical electrode. Chamber 28 contains a plug 29 of electrically insulative material such as polyethylene. Plug 29 has an opening 30 and supports wire electrode 31 by means of insulator 32. Metal coated quartz fibre 33 is affixed to electrode 31 at one of its ends. Transparent charging diaphragm cap 34 is provided with contact 35.

Casing 27 also supports within chamber 28 eyepiece 36, reticle 37 and objective lens 38. Reticle 37 is shown to have a scale 39. The range of scale 39 depends upon the quantities of radiation to which the dosimeter will be exposed. For radiation shelter use, the range will usually be from 0 to 200 millirads. Preferably scale 39 is marked off with suitable zones 40, 41, 42 to denote safe, caution and unsafe levels of radiations, the colors green, orange and red respectively being used to denote these latter levels. This allows an inexperienced person to evaluate radiation intensity level without prior technical training.

The charging circuit consists of step-up auto transformer 45 with winding 46. Winding 46 consists of primary winding portion X–Y and secondary winding portion X–Z. Spring switch 47 and battery 48 are connected in series with primary winding X–Y. Battery 48 is preferably of a type with long shelf-life such as a mercury button-type cell with a terminal voltage of about 1.3–1.5 volts. A diode 49 with high back resistance is connected in series with secondary winding X–Z. A capacitance 50 is shunted across secondary X–Z and diode 49. Output contacts 18 and 19 are shown connected to electrodes 21 and 22 respectively. Contacts 13 and 14 are shown engaged with contacts 15 and 16 respectively.

The operation of the charging circuit is as follows. By successively closing and opening switch 47, transient voltages are induced in the basically resistance-inductance circuit of the primary. Auto transformer 45 steps up these transient voltages to a level sufficient to charge the dosimeter. This voltage is applied to capacitance 50 through diode 49. The high back resistance of diode 49 prevents rapid discharge of capacitance 50. The charge built up on capacitor 50 is applied to output contacts 18 and 19 and consequently to charging electrodes 21 and 22.

The operation of the integrated dosimeter-charger is as follows. Dosimeter 2 is pushed into engagement with electrodes 21 and 22. Diaphragm 34 is thereby moved inwardly and contact 35 engages wire electrode 31. Charging electrode 21 is thereby engaged with contact 35 which is in engagement with electrode 31, and charging electrode 22 comes into contact with cylindrical electrode 27a which is brought out externally of diaphragm 34.

As hereinabove described, tapping the spring switch 47 a number of times builds up a charge across electrodes 21 and 22. This charge is applied to electrodes 31 and 27a of dosimeter 2. Fibre 33 is deflected by the applied charge. Light gathered by surface 23 of charger 3 is reflected into dosimeter 2. By looking into dosimeter 2 through eyepiece 36, the deflection of fibre 33 is indicated on scale 39 on reticle 37. Successive tapping of switch 47 will deflect the fibre past the zero indication on scale 39. By disengaging, then reengaging the dosimeter, the charge on the dosimeter electrodes will slowly leak off, causing the fibre to deflect back toward zero. When the fibre indication reaches zero, the charger is disengaged and the dosimeter is properly charged.

Radiation which bombards dosimeter chamber 28 acts to discharge the aforementioned applied charge and deflects the fibre 33 towards its normal position. By carrying the integrated dosimeter and charger on one's person, the amount of radiation received over any desired period of time will therefore be indicated on the dosimeter scale.

It will be understood that the embodiment of this invention described above is illustrative only, and that other embodiments will be apparent to those skilled in the art. Therefore, this invention is not to be limited to any particular embodiment but rather by the following claim.

I claim:

An integrated radiation dosimeter and charger capable of being transported in a clothing pocket comprising a cylindrical electrostatic quartz fibre dosimeter, a cylindrical charger case having a charging socket, said dosimeter being permanently and slidably mounted at one end in said charging socket of said case, an arcuate port formed in the outer shell of said case near said socket, said case having mounted therein a parabolic light-gathering and reflecting surface adjacent to and opposite said port and in communication with said socket, electrical charging means mounted within said case at the end away from said charging socket, said charging means being in the form of a cylindrical module, said module being potted so as to coincide with a plurality of arcuate recesses in the shell of said case, said recesses being fingertips, said electrical charging means comprising a step-up autotransformer having a primary circuit and a secondary circuit, said primary circuit including the primary winding of said step-up autotransformer, a battery and a spring switch connected in series with said primary winding and said secondary circuit comprising the secondary winding of said step-up autotransformer, a diode with high back resistance connected in series to one side of said secondary winding, a capacitance shunted across said diode and said secondary winding and connected to the other side of said secondary winding and output contacts electrically connected to the output terminals of said capacitance, a pair of electrodes electrically connected to said contacts and mounted within said socket, said dosimeter having contacts mounted at the charging end thereof such that when said contacts on said dosimeter are moved into engagement with said electrodes in said charging socket and said spring button switch is opened and closed, a charge is built up across said electrodes whereby said dosimeter is charged while in engagement with said electrodes, and such that light will be reflected by said surface in a concentrated beam into said dosimeter to illuminate a scale therein.

References Cited in the file of this patent

UNITED STATES PATENTS

| | | |
|---|---|---|
| 2,648,777 | Landsverk | Aug. 11, 1953 |
| 2,756,346 | Victoreen | July 24, 1956 |

FOREIGN PATENTS

| | | |
|---|---|---|
| 570,443 | Canada | Feb. 10, 1959 |